March 5, 1940.  L. C. SCHAEFER  2,192,331
CYLINDRICAL CONDUIT GATE VALVE
Filed Dec. 28, 1936  3 Sheets-Sheet 2
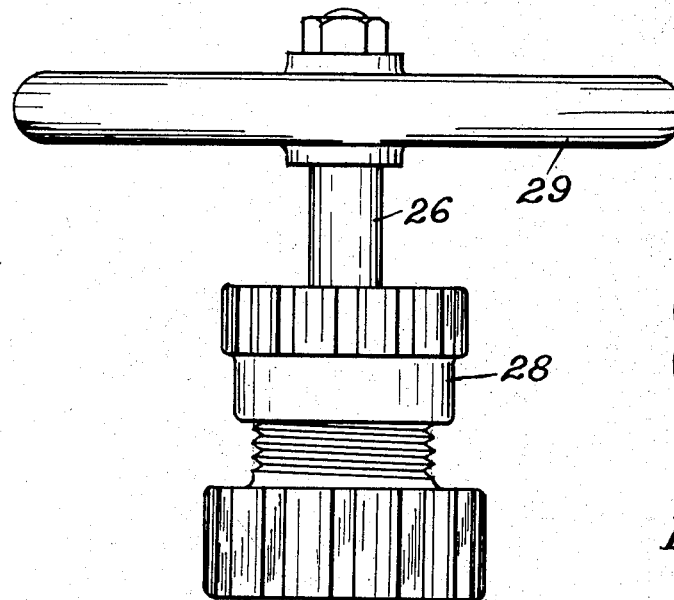
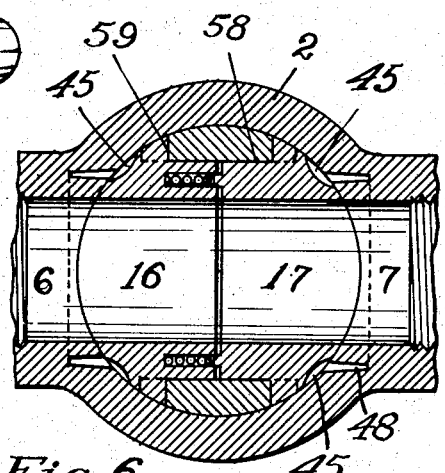
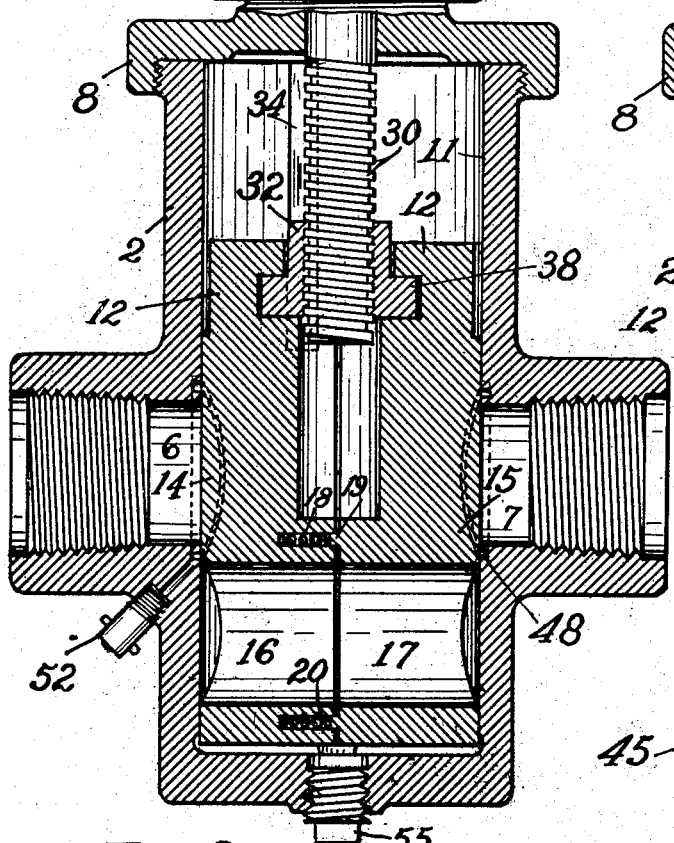
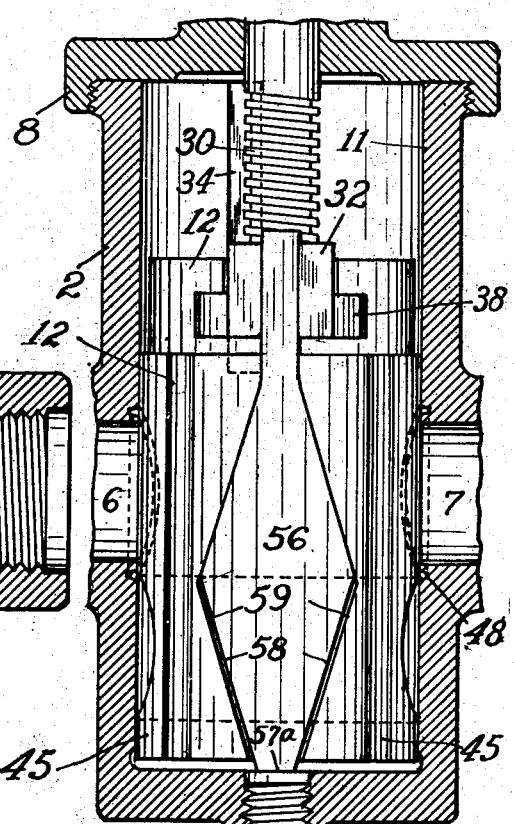
INVENTOR.
Louis C. Schaefer
BY
ATTORNEY.

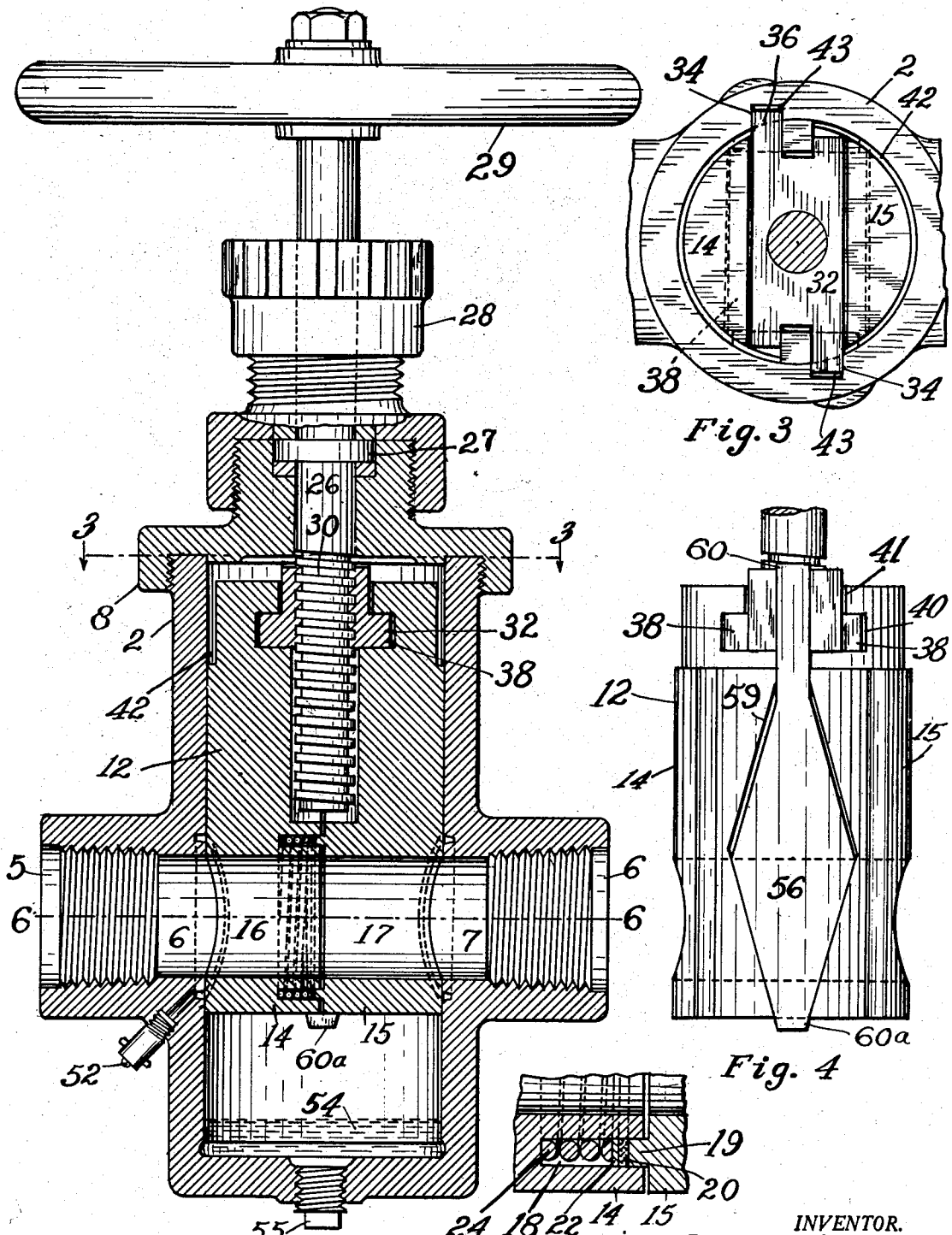

March 5, 1940.   L. C. SCHAEFER   2,192,331
CYLINDRICAL CONDUIT GATE VALVE
Filed Dec. 28, 1936   3 Sheets-Sheet 3

INVENTOR.
Louis C. Schaefer
BY
ATTORNEY.

Patented Mar. 5, 1940

2,192,331

UNITED STATES PATENT OFFICE 2,192,331

CYLINDRICAL CONDUIT GATE VALVE

Louis C. Schaefer, Dallas, Tex., assignor, by direct and mesne assignments, of one-half to William G. Ferguson, East St. Louis, Mo., as trustee Application December 28, 1936, Serial No. 117,777

23 Claims. (Cl. 251—68)

My invention relates to fluid pressure gate valves, commercially known as the conduit type, that passes drills and well drilling devices into the line particularly for the construction of pipe lines and conveying fluid under pressure requiring good sealing and easy manual operation.

An object of my invention is to provide a gate valve mechanism, applying additional pressure for the sealing action, transversely of the gate action, at open and closed positions of its ports in combination with the sliding action of the gate.

A further object of my invention is to provide a pressure gate valve for sealing the flow and conveying the flow of high pressure fluids without permitting the pressure to enter the packing of the operating stem, whereby the packing of the stuffing box may be accomplished while pressure is on the conduit in either open or closed position of the valve.

A further object of my invention is to provide an easily manually operated gate valve, having lubrication sealed in grooves around the seats, and around the gate, lubricating the cylinder wall in operation and lubricating the seats in either open or closed position and not contacting the line flow in either open or closed position, or in the operation of the valve and devised to permit replenishment of the lubricant in either open or closed position of the valve, either under pressure or otherwise.

A further object of my invention is to provide a gate valve, having a cylindrical gate providing non-rotation of the gate from that of the operating stem, whereby seat facings may be properly aligned to their seats in the body.

A further object of my invention is to provide a cylindrical gate valve having gate seats varying in material from that of the gate and cast thereto or devised with detachable means for repair or the selection of a suitable material to resist various fluids and gases differing in chemical action and abrasion.

A further object of my invention is to provide a gate valve having a seal ring, between the gate halves, supported by an annular tongue and groove about the gate ports acting telescopically, preventing leakage therefrom, through the parting of the gate halves, and supporting the alignment of the said gate halves.

A further object of my invention is to provide a cylindrical gate valve having a split gate supported to the operating stem by a nut supporting each half of the gate equally in operation and devised to automatically align the stem supporting member with the cylinder.

Other objects will appear from the following description taken in connection with the accompanying drawings.

In the drawings accompanying this application,

Figure 1 is a vertical sectional view through the valve with its ports in the position they assume when the valve is open.

Figure 2 is a vertical section through the valve similar to Figure 1 showing the gate in closed position which illustrates the gates sealing the conduit.

Figure 3 is a fragmentary plan view on line 3—3 of Figure 1, showing the cylindrical gate appearing with the bonnet removed illustrating the keyway construction that prevents rotation of the gate by the rotation of the stem in operation.

Figure 4 is a side elevation of the cylindrical gate illustrating the wedging action when the gate is in open position.

Figure 5 is a fragmentary sectional view of the valve showing the cylinder in elevation similar to Figure 4 differing by showing the gate in closed position and illustrating the wedges in contact with the body at the bottom.

Figure 6 is a fragmentary horizontal section of the valve on line 6—6 of Figure 1.

Figure 12 is an enlarged fragmentary sectional view to illustrate the seal ring and spring that separates the sections of the gate.

In describing my invention, reference is made to the accompanying drawings in which like reference numerals indicate like parts in the several views.

Figure 7:
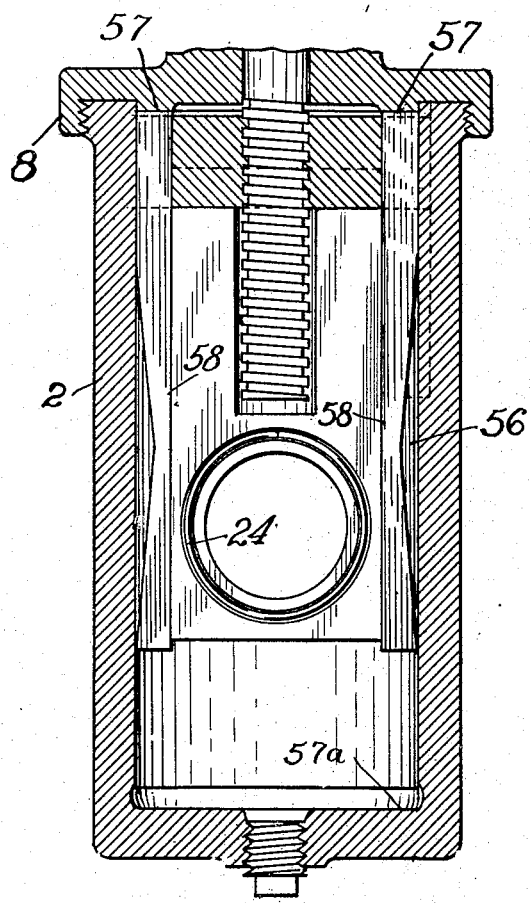
Figure 7 is a fragmentary vertical section of the valve showing half of the gate removed illustrating the wedges contacting with the bonnet as the travel affords transverse movement in sealing.
Figure 8:
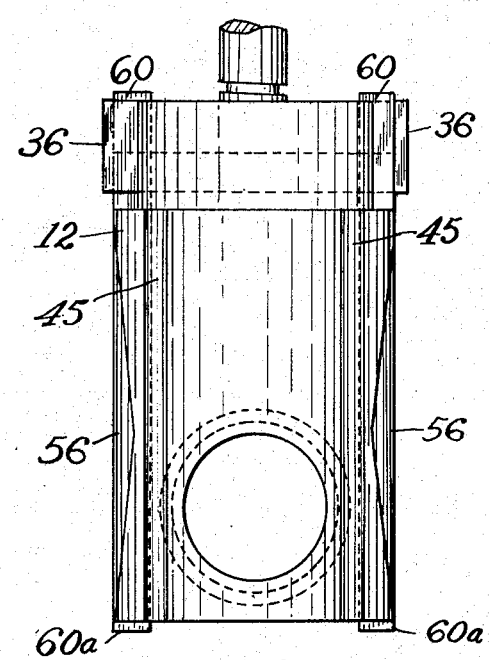
Figure 8 is a vertical elevation view of the cylindrical gate from the port sides similar to Figure 4.

In the drawings, 2 designates the body of the gate valve. Conduit connections 4 and 5 support the valve and convey the fluid under pressure to and from the unit. Ports 6 and 7 supply the fluid to the gate.

A bonnet 8 supports the operating mechanism and provides a covering for the body 2 and is substantially secured thereto to provide a housing for the gate mechanism 12 comprising the combination of two semi-cylindrical sections 14 and 15 having ports 16 and 17.

The seal ring 20 is held against the annular tongue 19 by the pressure of a spring 24 seated in the groove 18, a metallic ring 22 being interposed to provide a seat for the spring against the seal ring 20. The tongue-and-groove connection 19—13 also serves to align the gate halves, while the spring 24 exerts an outward pressure to force the gate halves 14 and 15 against their respective seats in the body 2.

To open and close the gate from the exterior a valve stem 26 of the non-rising stem type is supported in the bonnet 8 by the collar 27 and sealed by a suitable packing gland 28.

The actuation of the gate is performed by rotating the handwheel 29 operating the stem 26 to rotate its threaded portion 30 in the nut 32. To prevent rotation of the nut 32 and the gate unit 12, keyways 34 in the cylinder 10 guide the tongues 36 of the nut in its rising and lowering movements.

The nut 32 is provided with flange 38 engaging grooves 39 in the gate halves 14 and 15 affording engagement with the gate unit 12 such as to keep the halves of the gate equally and securely aligned with the ports 16 and 17.

Clearances 40 and 41 at the sides of the nut 32 provide for shift of the nut to accommodate inaccuracies in the manufacture of the structure and to afford self adjustment between the stem support and the gate, and clearances 42 of the gate and 43 of the nut afford adjustment transversely to the above described adjustment for the same purposes.

Vertical grooves 45 in the gate 12 provide by-passes to prevent pressure from forming above or below the gate by entrapment of air and retarding the movement thereof.

To lubricate the seats and walls of the cylinder, annular grooves 48 in the body and 49 in the gate afford distribution of the lubricant. To replenish the lubricant, a suitable sealed connection 52 affords contact with any suitable charging means. Accumulated lubricant and sediment forming in the lower portion of the cylinder at 54 may be discharged by removing the plug 55 in the bottom of the body.

To expand and contract the gate halves and their respective seat facings, double acting wedges 56 are seated in suitable recesses 58 in the gate halves and nut 32 and are carried thereby against the cylinder walls 11. The tapering cavities 58 are sufficiently larger than the double wedges 56 to allow contraction of the gate halves 14 and 15 for releasing the sealing force. Extensions 60 and 60a at top and bottom of the double wedge afford contact with the body near the limits of travel of the gate to stop the wedge while the gate continues its travel, thereby producing a wedging action during the last part of the gate travel.

Figure 10:
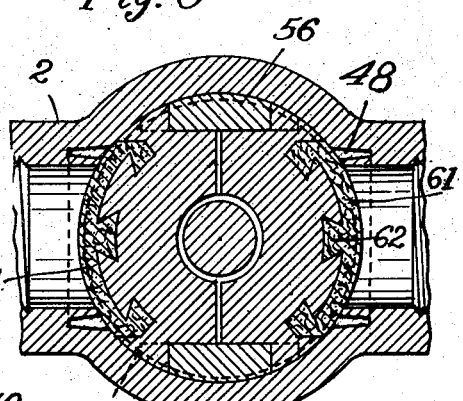
Figure 10 is a fragmentary horizontal section of the valve on line 10—10 of Figure 9 illustrating the seats cast integral with the gates.
Figure 9:
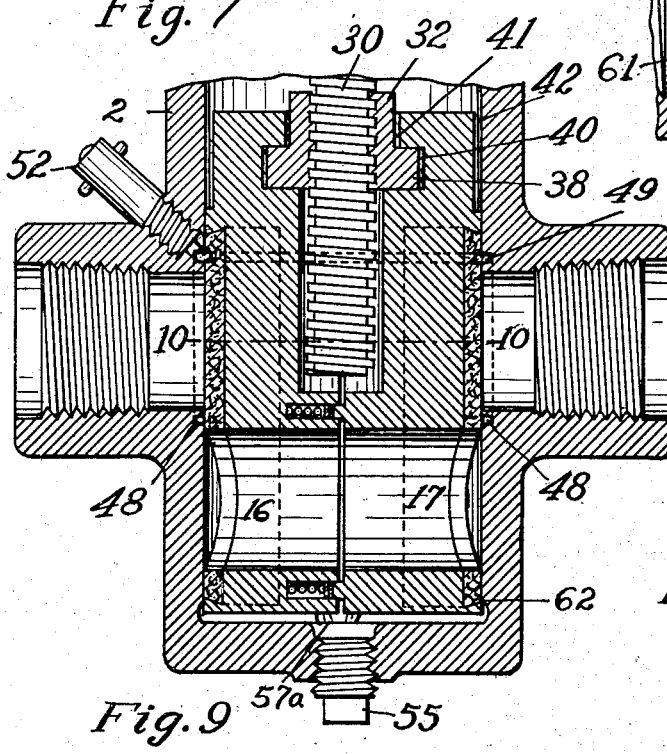
Figure 9 is a fragmentary section of the valve similar to Figure 2 illustrating the application of seats differing in material from that of the gate and having annular lubrication about the gate to afford lubrication from port to port.

Another form of my cylindrical gate is illustrated by Figure 9 showing the facings 61 integral with the gate halves and secured substantially by recesses and dovetail means 62 illustrated in Figure 10.

Figure 11:
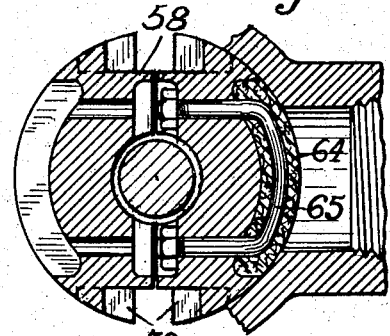
Figure 11 is a fragmentary horizontal section of the gate similar to Figure 10 showing detachable gate seats.

In the arrangement shown in Figure 11, detachable facings 64 support a U bolt 65 cast in combination with the facings and securely bolted to the gate halves to facilitate replacement.

In the operation of my invention the body 2 is lubricated from the sealed connection 52 as well as some lubricant being placed in all parts during assembling including some additional placed in the bottom of the cylinder.

The operation of the unit in open position of the gate as will be illustrated by Figure 1, the operating wheel 29 is rotated to raise the gate 12 sufficiently to have the double wedge 56 travel thereby making strong contact with the stationary stops of the bonnet 8 at 57 illustrated in Figure 7, whereby in travel the gate halves 14 and 15 forcing on the double wedge perform spreading action on the walls 59 of the double wedge cavity 58 in the gate halves 14 and 15 illustrated in Figure 4, sealing the ports 16 and 17 annularly about the ports 6 and 7 thereby providing a sealed conveyance through the respective conduits.

In the closing operation of the unit the action is the reverse of the above illustration, by rotating the handwheel righthandedly the gate will travel from open to closed position illustrated by Figure 2, the rotation of the operating stem thread forces the nut 32 and its respective gate halves 14 and 15 downwardly releasing the wedging pressure that was applied in the previous action, freeing the gate halves to slide in the cylinder walls continuing to closed position when the double wedges 56 contact the stationary stops 57a of the body and force the wedging action at the upper portion of the gate halves 14 and 15, expanding the gate against the cylinder walls at the seats of the conduit sealing them.

As this description is of a detailed character in order that the invention may be completely set forth, it is understood that the specific terminology is not intended to be restrictive or confining, and the various arrangements of parts and modification of structural detail may be resorted to without departing from the scope of spirit of the invention as herein claimed. I do not limit myself in anywise except as specifically noted in my several claims which I desire to be interpreted broadly, each independently of limitation contained in other claims.

Having thus described my invention, what I claim is:

1. A cylindrical gate valve comprising, a body having a valve chamber therein and provided with inlet and outlet passages communicating laterally with said chamber, an expansible two-part valve structure mounted for reciprocatory movement in said cylindrical opening and provided with a port extending transversely through the two parts, one of said parts having an annular groove around the opening, and an annular tongue on the other valve member telescopically received in said groove providing a guide to align the ports in said valve parts.

2. A gate valve comprising, a body portion having a valve chamber therein and provided with inlet and outlet passages communicating laterally with said chamber, a two-part split valve mounted for reciprocatory movement in said chamber, means to move said valve within the chamber to opened and to closed positions, and wedge mechanism associated with and additional to the two-part valve to expand said valve at each extreme of movement to tighten the valve within the chamber.

3. A gate valve comprising, a valve body having an elongated valve chamber and provided with inlet and outlet passages communicating laterally with the valve chamber, a split two-part piston-like valve structure fitted movably within the valve chamber, means to move said valve structure to opened and to closed positions with respect to the inlet and outlet passages, and double wedge means additional to and carried by and cooperating with said two-part valve structure operable at each extreme of movement of the valve to expand the parts thereof against the wall of the valve chamber.

4. A gate valve comprising, a body having a valve chamber and provided with inlet and outlet passages communicating laterally with said chamber, a two-part expansible valve structure movably fitted in said valve chamber and having a passage to be aligned with the inlet and outlet passages in one extreme movement, means to move said valve to two extremes in one of which the passage thereof registers with the inlet and outlet and in the other of which the passage is out of registry, and wedge means movable relatively to both of said valve parts to expand the two parts of the valve in each of its extreme positions to bear forcefully against the wall of the valve chamber.

5. A gate valve comprising, a body having a valve chamber and provided with inlet and outlet passages communicating laterally therewith, a valve structure consisting of a pair of substantially semi-cylindrical valve members mounted for endwise reciprocatory movement within the valve chamber with the line of division intermediate the ends of communication of the inlet and outlet openings, means to move said two-part valve structure within the chamber, and wedge means movable relatively to both said members but by said valve structure operable by contact with the valve body at each extreme of movement of the valve structure to expand the two parts thereof into fluid sealing contact with the wall of the valve chamber.

6. A gate valve comprising, a body having a valve chamber therein and having inlet and outlet passages communicating laterally with said chamber, a valve structure movable endwise within the valve chamber made up of two half portions having the edges of their adjacent faces spaced from the inlet and outlet passages, and means to move said valve structure within the valve chamber to positions to open and to close the passages, the two parts of the valve structure being provided on adjacent faces with telescopically interfitting portions to align the ports in said half-portions.

7. A gate valve comprising, a body having a valve chamber therein and provided with laterally communicating inlet and outlet ports, a two-part valve structure fitted for endwise movement within the valve chamber with the line of division of the parts intermediate the openings of the inlet and outlet ports, said valve members being provided with registering ports to align with the inlet and outlet ports when the valve is in opened position and having solid wall portions facing over the inlet and outlet ports when the valve is closed, means to move said valve structure unitarily to opened and to closed positions, said two valve parts having recesses in adjacent sides of substantially double wedged form, double wedged form means in said recesses, and means operating said wedge means at each extreme of movement to cause expansion of the two-part valve structure.

8. A gate valve comprising, a body having a valve chamber therein and provided with laterally communicating inlet and outlet ports, a two-part valve structure fitted for endwise movement within the valve chamber with the line of division of the parts intermediate the openings of the inlet and outlet ports, said valve members being provided with registering ports to align with the inlet and outlet ports when the valve is in opened position and having solid wall portions facing over the inlet and outlet ports when the valve is closed, means to move said valve structure unitarily to opened and to closed positions, said two valve parts having recesses in adjacent sides of substantially double wedged form, double wedged form means in said recesses having extending ends to engage the body structure in each extreme of movement to cause expansion of the two-part valve structure, and means to retain said valve structure to reciprocate within the valve chamber and against rotating therein to thus insure alignment of the port through the valve structure with the inlet and outlet ports.

9. A gate valve comprising, a body having a valve chamber therein and provided with laterally communicating inlet and outlet ports, a two-part valve structure fitted for endwise movement within the valve chamber with the line of division of the parts intermediate the openings of the inlet and outlet ports, said valve members being provided with registering ports to align with the inlet and outlet ports when the valve is in opened position and having solid wall portions facing over the inlet and outlet ports when the valve is closed, means to move said valve structure unitarily to opened and to closed positions, said two valve parts having recesses in adjacent sides of substantially double wedged form, double wedged form means movable longitudinally within the recesses of the valve member, and extensions on said double wedged form means at each end to engage with the valve body structure to move said wedge means as the valve structure approaches each of its extremes of movement.

10. A gate valve comprising, a valve body having a valve chamber therein and provided with inlet and outlet passages communicating laterally with said chamber, a longitudinally split and expansible two-part valve structure mounted for reciprocatory movement in said chamber and having a port extending transversely through the two parts to thus establish communication through the valve body from the inlet to the outlet passages thereof in one extreme position of the valve structure and to close communication in another position of the valve structure, said two valve parts being provided on adjacent faces with interfitting parts around the port extending transversely therethrough to thus maintain alignment between the two parts as they travel together, and wedge means associated with and movable relatively to the two-part valve to expand said valve at each extreme of movement to tighten the valve within the casing.

11. A gate valve having a shell with parallel, inner, ported bearing surfaces, and a gate assembly bodily shiftable to open or closed position on said surfaces and including independent, ported gate plates, each including an integral, rigid closure part, means directly connected to and for concurrently shifting the plates, and a wedge member carried by and between and for forcing the plates to seating and sealing contact on the surfaces at either of the gate positions.

12. A gate valve having a shell with opposite ported walls, a pair of opposite, sealing plates sliding on said walls to open or closed positions with the wall ports and including fixed closure portions, means connected to and for concurrently co-directionally shifting the plates, and a double wedge-point device between and carried by the plates for laterally wedging them outward in either open or closed position following arrest of said device at limits of its strokes in either direction with the plates.

13. A valve having a shell with opposite, ported walls, a pair of rigid gate plates shiftable on the walls to open or close the wall ports and including fixed closure parts, means attached to the plates for co-directionally moving them concurrently, and a double, reverse point wedge member movably fitted between and carried by the gate plates and operative to set them on the walls at either open or closed position when said member is first arrested in either extreme position of its strokes.

14. A gate valve having a shell with opposite, ported walls, a screw stem turnably packed in the shell, a pair of gate plates slidable on the walls to close or open the wall ports, an actuating yoke nut on the screw stem slidably and directly connected to the plates for co-directionally shifting the plates, and a double, reverse taper means carried solely by and for expanding the plates at either limit of their shift to seal on the plates; said means being arrestable at the extremes of its movements to effect subsequent expansion of the plates at their extreme stroke positions.

15. A valve as in the preceding claim, and in which said means is operative upon initial movement of the actuated plates to reduce the seating pressure of the plates and facilitate movement of the same between extreme, open or closed positions as to the ports.

16. A gate valve having a shell with opposite, ported walls, gate plates slidably fitted on the walls, a yoke member slidably interkeyed to the plates, a screw stem for actuating the yoke to co-directionally move the plates to open or closed position as to the ports, and a double-acting two-pointed wedge member carried solely by the plates to relatively expand and set them on the walls, and being initially arrestable as the plates approach limits of movement in either direction by said yoke.

17. A gate valve having a shell with opposed, ported walls, and a gate assembly including a pair of opposite plates slidable on the wall to open or close the ports, a wedge member operatively fitted between and carried by the plates, and means attached to the plates to co-directionally shift them; said member having oppositely converged end portions operative to expand relative ends of the plates when the member is arrested in extreme position of either of its strokes with the plates and as these latter have any further shift on the said arrested member.

18. A valve as in the preceding claim, and in which the said means is operative to exert shifting effort on the plates after the said member has stopped at either extreme position in the shell.

19. A valve of the class described, including opposite, ported shell walls, a screw stem turnably packed in the valve shell, a yoke nut on the screw stem, a pair of ported plates slidably fitted on the said walls and being connected to said yoke and slightly laterally movable relative thereto, an expander element comprising a core arrestable at each end by engagement with a shell part and having oppositely converging wedge ends fitted between and carried by the plates and whereby the plates are automatically laterally forced to their shell walls when the said element is arrested in its extreme movement in either direction of shift of the plates, and said yoke operative to exert further shifting effort on the plates to cause them to slide outward on the expander element to port sealing engagement at either extreme of shift.

20. In a valve of the class described, two opposite ported plates, actuating means slidably connected to the plates to concurrently, longitudinally shift them in either direction, a wedge member carried by and movably fitted between the plates and constructed and arranged to automatically laterally spread the plates at the extremes of their strokes in either direction, and means to arrest said member at the extremes of its strokes, in either direction, before cessation of movement of the plates by the actuating means.

21. In a valve of the class described, a wedge member having oppositely converging ends and being bodily longitudinally shiftable, means to limit motion of the wedge in each direction, a pair of ported, valve port closing plates movably fitted on respective sides of the wedge member and operative to bodily shift the member, and actuating means slidably connected to the plates to concurrently longitudinally shift them and said member in either direction until the wedge member is first arrested and to then further shift the plates as to the arrested member so that the plates are spread laterally to engage respective valve seats in either the port opening or closing position of the plates.

22. A valve as in the preceding claim, and in which the actuating means acts, on reverse, to first draw the plates from that end of the wedge which is, when the wedge member is arrested, functioning to set the relative end of the plates to their seats.

23. A valve having opposite, ported walls, a pair of plates with ports to uncover the wall ports, means slidably connected directly to the plates to concurrently shift them longitudinally on the walls, and a wedge member slidably fitted between and operative by the plates and being arrestable at extreme positions during movement with and by the plates and acting to laterally spread the plates to seats on the walls as they approach their limit of movement in either direction by the shifting means.

LOUIS C. SCHAEFER.

CERTIFICATE OF CORRECTION.

Patent No. 2,192,331. March 5, 1940.

LOUIS C. SCHAEFER.

It is hereby certified that error appears in the printed specification of the above numbered patent requiring correction as follows: Page 2, first column, line 34, for the word "flange" read --flanges--; page 3, first column, line 43, claim 5, after "but" insert --carried--; and that the said Letters Patent should be read with this correction therein that the same may conform to the record of the case in the Patent Office.

Signed and sealed this 14th day of May, A. D. 1940.

(Seal)

Henry Van Arsdale,
Acting Commissioner of Patents.